United States Patent [19]
Primich

[11] Patent Number: 6,105,621
[45] Date of Patent: Aug. 22, 2000

[54] FLEXIBLE OVAL DUCT FOR HEATING AND COOLING SYSTEMS AND METHOD SUCH DUCTS

[76] Inventor: Theodore Primich, 2700 E. 5th Ave., Gary, Ind. 46402

[21] Appl. No.: 09/069,514

[22] Filed: Apr. 29, 1998

[51] Int. Cl.$^7$ ............................................... F16L 11/112
[52] U.S. Cl. ........................... 138/133; 138/144; 138/154
[58] Field of Search ........................... 138/129, 133, 138/127, 121, 144, 154

[56] References Cited

U.S. PATENT DOCUMENTS

| | | | |
|---|---|---|---|
| 2,247,416 | 7/1941 | Sands et al. | 138/133 |
| 2,486,387 | 11/1949 | Bringolf | 138/133 |
| 2,848,015 | 8/1958 | Roberts et al. | 138/121 |
| 3,216,459 | 11/1965 | Schroeder et al. | 156/143 |
| 3,362,434 | 1/1968 | Medford et al. | 138/154 |
| 3,610,289 | 10/1971 | Moss | 138/131 |
| 4,104,097 | 8/1978 | Gregory et al. | 156/143 |
| 4,203,476 | 5/1980 | Vitellaro | 138/129 |
| 4,204,562 | 5/1980 | Kelly | 138/129 |
| 4,299,641 | 11/1981 | Kelly | 156/143 |
| 4,304,266 | 12/1981 | Kutnyak et al. | 138/129 |
| 4,342,612 | 8/1982 | Lalikos et al. | 138/121 |
| 4,459,168 | 7/1984 | Anselm | 156/143 |
| 4,478,657 | 10/1984 | Schroeder et al. | 138/DIG. 1 |
| 5,526,849 | 6/1996 | Gray | 138/133 |
| 5,778,941 | 7/1998 | Inada | 138/127 |
| 5,954,096 | 9/1999 | Lepoutre | 138/129 |

*Primary Examiner*—James Hook
*Attorney, Agent, or Firm*—Marshall A. Burmeister

[57] ABSTRACT

A flexible duct for use in a heating or cooling system having an elongated wire cemented between two elongated plastic ribbons and wound into a multi-turn coil, a portion of the plastic ribbons of each turn overlapping and being cemented to a portion of the plastic ribbons of adjacent turns to form a duct, the wire forming a plurality of identical turns with each turn having a pair of U-shaped end portions and a pair of elongated portions, the elongated portion being interconnected by an end portion and being aligned with the elongated portions of adjacent turns. A method of making such duct and apparatus for making such duct are also disclosed.

9 Claims, 5 Drawing Sheets

FLEXIBLE OVAL DUCT FOR HEATING AND COOLING SYSTEMS AND METHOD SUCH DUCTS

The present invention relates to ducts for transporting air in heating, cooling and ventilating systems for controlling the environment within structures and isolated regions thereof, and to methods of making such ducts. More particularly, the present invention relates to ducts for transporting air in heating, cooling and ventilating systems in and through the walls of buildings, and to methods of making such ducts.

BACKGROUND OF THE INVENTION

It is common practice in modern construction to provide a system for heating or cooling or ventilating a structure. Most installations utilize moving air for one or more of these functions, and it is common to either heat or cool the regions of a building to be temperature controlled with a system of ducts to transport temperature controlled air from a central heating or cooling source to the various regions to be heated or cooled.

In most recently constructed houses, the central heating or cooling source is either a hot air furnace or a coolant-to-air heat exchanger of a central cooling system, and in climates requiring both heating and cooling, both may be employed. Often, the central heating or cooling source is disposed in a basement of the house, or in a pit disposed in the ground beneath a ground-level floor of the house. The air from the source is transported under pressure to a plurality of register heads. The most economical way to transport the air flow in such structures is through ducts located beneath the floors, in the walls and above the ceilings of the structures.

A common practice in the United States is to construct walls using equally spaced vertical studs which support a layer of material on each of the opposite sides of the studs, such as plaster, plaster board, fiber board, particle board, or the like. This construction provides open channels between the studs which are suitable for accommodating ducts for transporting air in heating or cooling systems. Because the studs are generally 4 or 6 inches thick and disposed on 16 inch centers, the cross section of the space between adjacent studs is rectangular, and with 4 inch studs, the maximum usable cross section of the wall channel is about 14 by 3½ inches.

In order to optimize the air flow through a duct in such a wall, substantially rigid rectangular ducts constructed of sheet metal have been employed. Such ducts are available commercially in 3½ inch thicknesses and various widths ranging to 14 inches, but the length of available sections are relative short, namely 24, 48, 60, 96 and 100 inches. The sections must be connected together to provide the proper length of duct for each installation, and since the duct is rigid, fittings such as elbows, and angles constructed of sheet metal must be used to provide bends between sections. The sheet metal ducts and fittings are relatively costly and require significant labor to install. Further, the installation must be skillfully completed to assure against leaks, vibration and other noises. Hence, an installation constructed in this manner is relatively costly.

Installations between adjacent studs have also been made using rigid oval sheet metal duct which reduces air flow noise and permits the use of duct with cross sections approaching those of rectangular duct. Spiral-Helix, Inc. of Buffalo Grove, Ill. is marketing a machine for converting rigid-cylindrical sheet metal pipe to oval pipe by stretching the cylindrical pipe from the interior thereof to assume a flat oval shape. Such rigid oval pipe may be installed in the channels between studs in walls and will provide air moving capacity under these conditions significantly greater than a cylindrical duct of the diameter of the studs and approaching the air moving capacity of rectangular duct, but it, like rigid rectangular duct, requires skilled installation and sheet metal fittings to achieve bends, thus retaining the cost disadvantages of rectangular duct.

Further, all rigid duct has the disadvantage of requiring relatively large cartons for storage and shipment, and in order to reduce the size of the cartons, such rigid duct is constructed in relatively short sections. The large cartons add to the cost of storage and shipment, and the short sections add to the cost of installation.

The inventor has recognized that a reduction in the cost of materials and installation could be achieved by using flexible oval or rectangular duct, but such a duct is not commercially available. U.S. Pat. No. 3,216,459 granted on Nov. 9, 1965 to C. A. Schroeder and O. L. Clark entitled *Flexible Insulated Duct* does disclose a generally rectangular flexible duct which comprises an inner generally rectangularly shaped wire coil surrounded by one or more layers of thermal insulating material and an outer plastic sleeve. The duct of this patent does not have a flexible inner plastic tube which is supported by the wire coil. Further, the duct of the patent lacks a vapor barrier which is generally required in modern heating, cooling or ventilating systems. In addition, the duct of this patent is limited in length to the length of the collapsible mandrel used in its production.

SUMMARY OF THE INVENTION

The principle object of the present invention is to provide a flexible duct for heating, cooling or ventilating systems which overcomes the disadvantages of the prior art. Thus, the general object of the present invention is to provide a duct which is less costly to construct than rigid duct, does not require fittings for achieving bends in installations, is less costly to install, does not require the skill for installation that is required for rigid duct, may be packaged in smaller containers than rigid duct for storage and shipment, and has the same or greater air flow capacity when installed in the walls of a building than the rigid duct known to the prior art. More specifically, it is an object of the present invention to provide a flexible duct with an oval cross section suitable for use in transporting air in a heating, cooling or ventilating system, and a method for producing such duct.

Several years ago, the inventor developed a process for making a flexible duct with a circular cross section which is suitable for transporting air in a heating, cooling or ventilating system and a process for producing such flexible round duct in sections of unlimited length. This duct is produced by winding two elongated ribbons of thin flexible plastic and a resilient wire on a rotating mandrel, cementing the ribbons and wire together on the mandrel, and slipping each completed turn from the mandrel as the following turn is being produced. In the finished product, the wire is cemented between the two ribbons to form a single elongated strip, and the strip is wound into a multiturn coil. Each turn of the elongated strip has edges overlapping the edges of adjacent turns, and the overlapping edges are cemented together to form an air impermeable elongated tube. The wire assumes the shape of a helix and provides the rigidity to maintain the shape of the elongated flexible duct. The wire is selected to have sufficient stiffness to prevent collapse of the duct under condition of service, and also to have sufficient resilience to permit bending of the duct. In practice, the wire is made of high carbon, hard drawn spring steel, and the ribbons are of plastic. Such flexible duct is available commercially from Gary Steel Products Corp. of Gary, Ind. under the mark ZIPP-R FLEX.

The inventor perceived that flexible duct with an oval cross section, similar to the round flexible duct described above, could achieve the objects and advantages of the present invention, but flexible oval duct suitable for transporting air in a heating, cooling or ventilating system could not be manufactured by the known methods of the prior art and did not exist prior to the present invention. The process for producing flexible duct with a round cross section, described above, may not be readily modified to produce a flexible duct with an oval cross section, because of the complications which would be created by the use of a rotating oval mandrel. Reforming flexible duct with a circular cross section into oval duct by stretching the flexible duct from the inside using the machine of Spiral-Helix, Inc., described above, would require stretching of the plastic as well as the wire, which would be undesirable, and in addition would be limited by the length of the mandrel of the Spiral-Helix machine to relatively short sections of duct, thus making this process unsuitable. It is therefore a further object of the present invention to provide a wire reinforced flexible duct with an oval cross section and a process for making such wire reinforced flexible duct.

Further objects and advantages of the present invention will be apprehended from the following specification and the accompanying drawings, which may be described as follows.

DETAILED DESCRIPTION OF THE INVENTION

Figure 1:
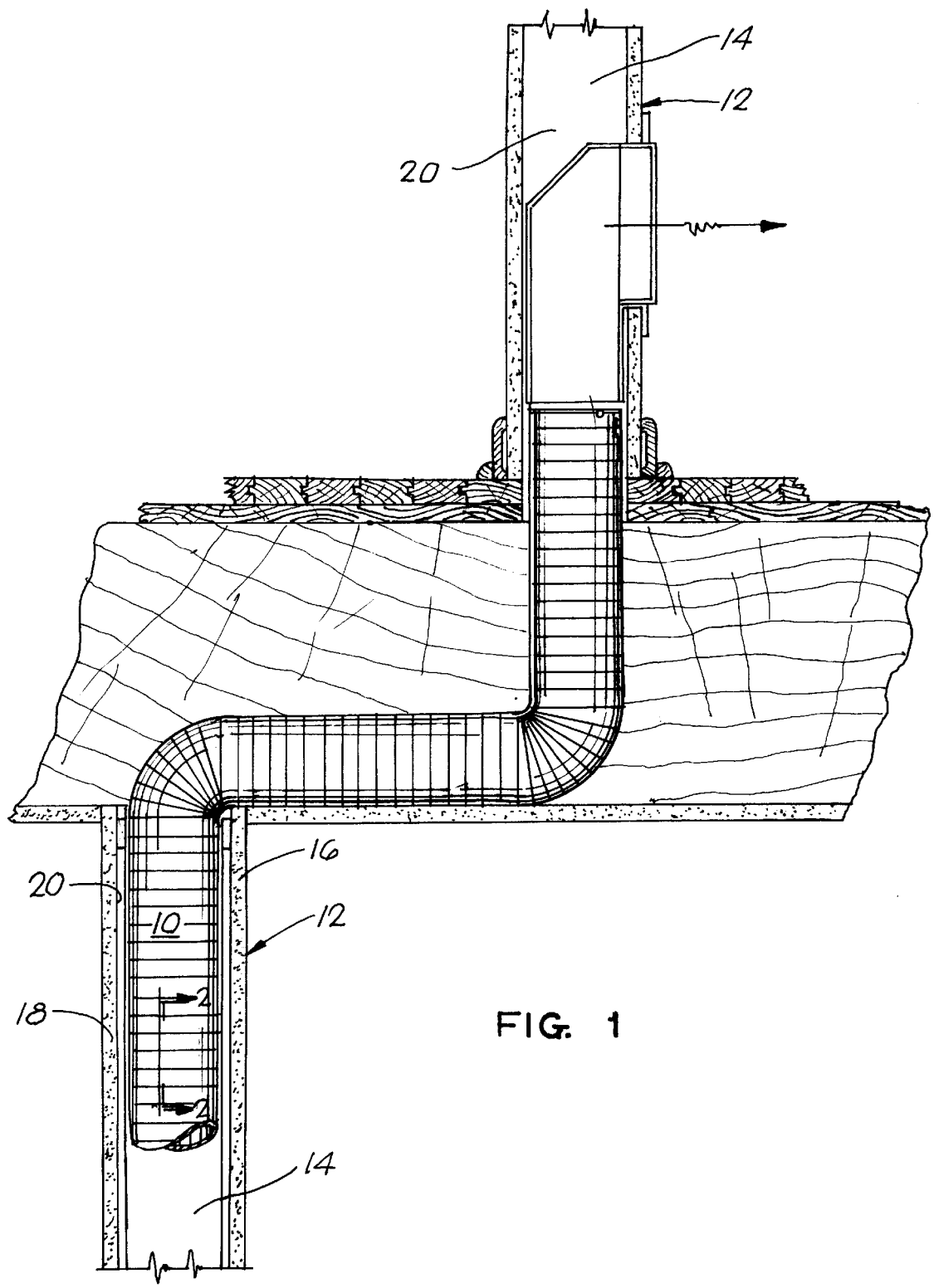
FIG. 1 is a fragmentary sectional view of a building with an air heating/cooling installation constructed according to the present invention.

FIG. 1 illustrates a fragment of an air distribution system constructed according to the present invention installed in an otherwise conventional heating, cooling and ventilating system for a conventionally constructed house. The air distribution system employs duct a 10 constructed according to the teachings of the present invention. The house has walls 12 constructed with a plurality of vertical studs 14 disposed at spaced equal intervals in a common plane. Typically, the studs 14 are nominally 2 inches by 4 inches and spaced at 16 inch centers. The studs 14 support wall panels 16 and 18 which are secured on opposite sides of the studs to complete the wall 12 and form a channel 20 between adjacent studs 14 and the attached wall panels 16 and 18.

With this construction, each of the channels 20 has a rectangular cross section of about 14 inches by 4 inches, or about 56 square inches, which is greater than the cross sectional area of an 8 inch round duct. Since a 6 inch round duct, with about one-half of that cross sectional area, will generally deliver sufficient air for such installations, the area of each channel 20 is more than sufficient to contain the air distribution ducts of such an installation. In the preferred construction here described, the duct 10 is oval in cross section and has an axis of elongation of about 7½ inches and a transverse axis of about 3¼ inches.

Figure 2:
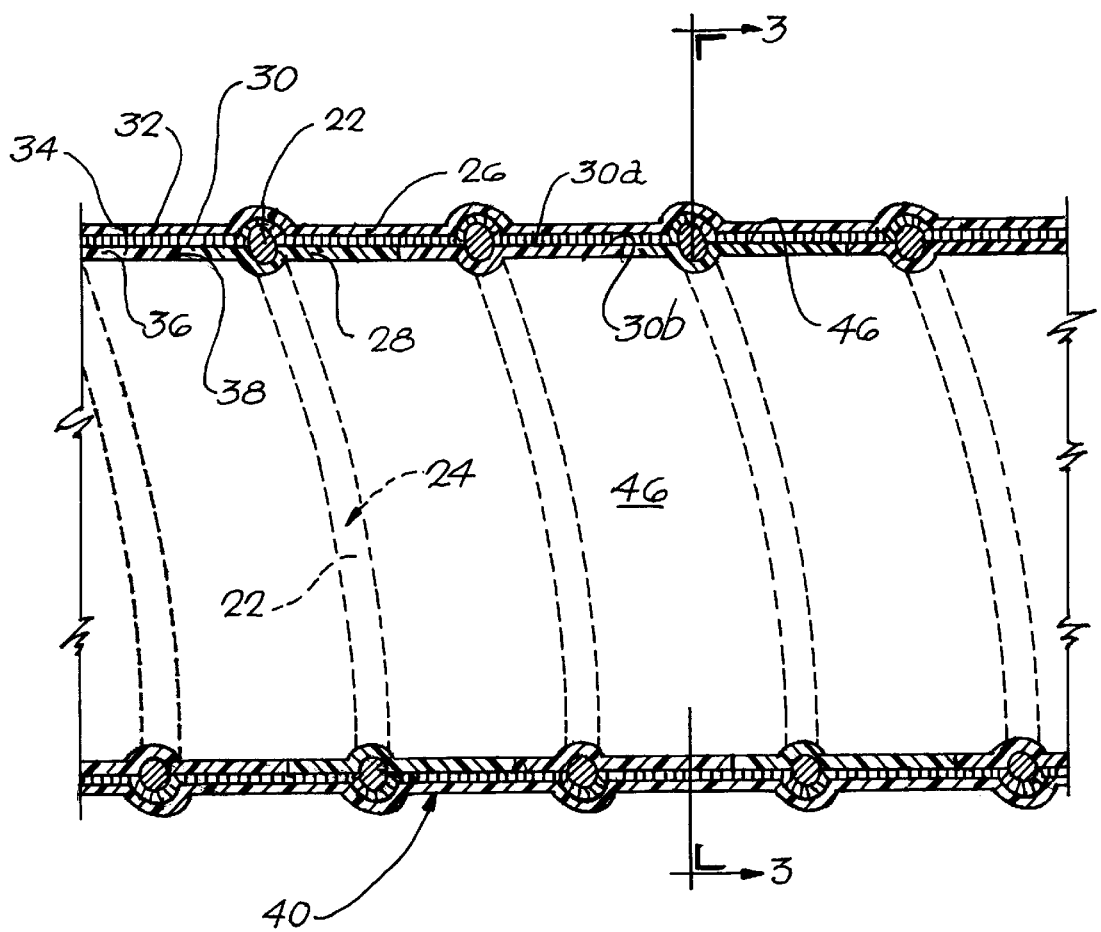
FIG. 2 is a fragmentary central longitudinal sectional view of the duct taken along line 2—2 of FIG. 1.
Figure 3:
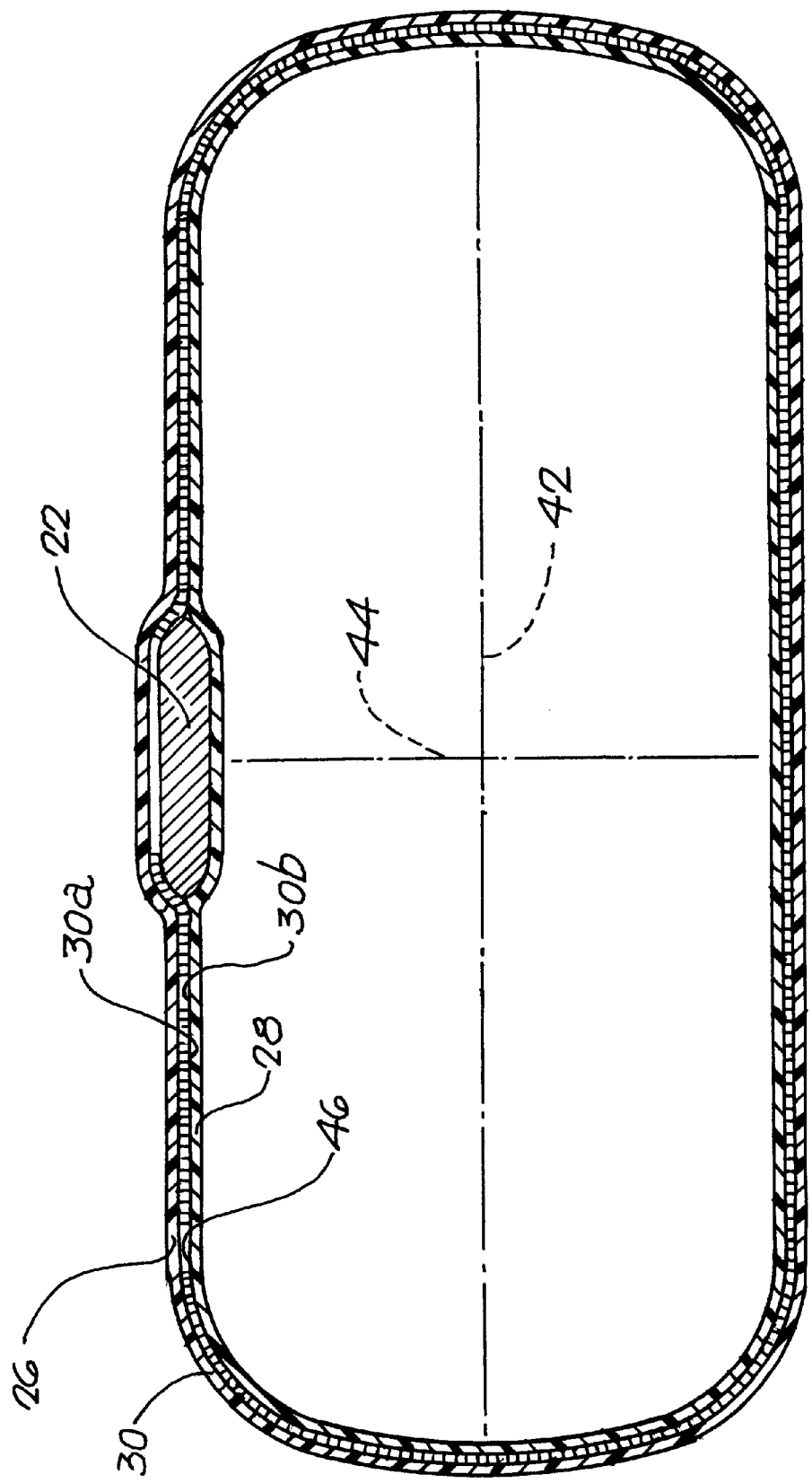
FIG. 3 is a sectional view of the duct taken along line 3—3 of FIG. 2.
Figure 6:
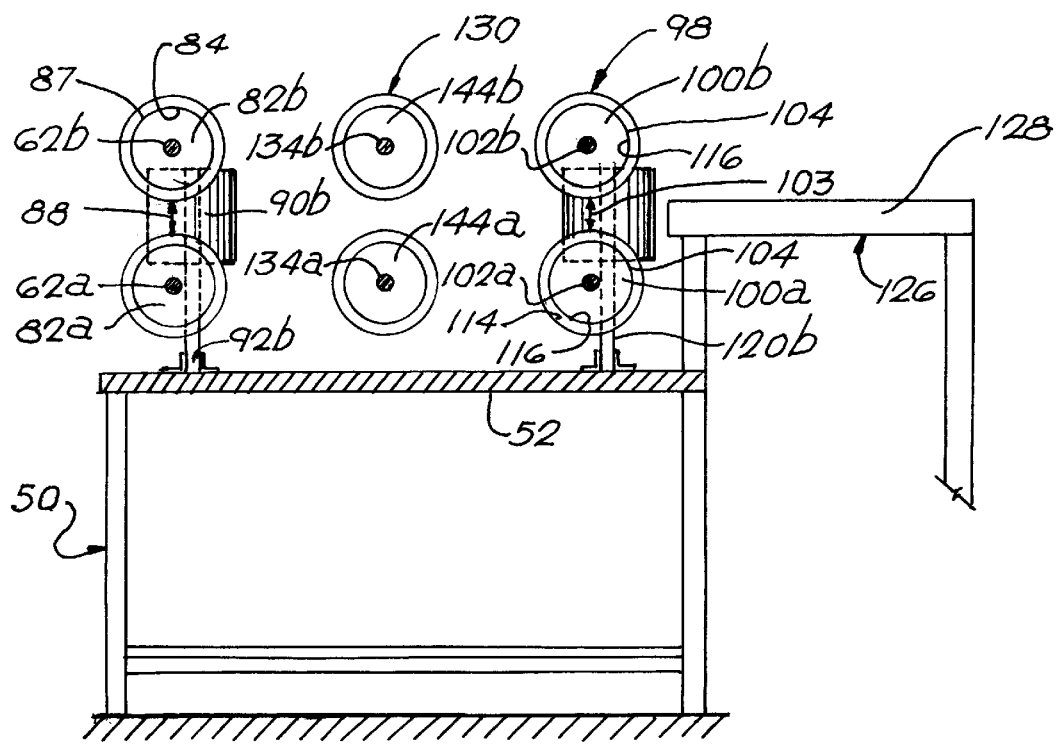
FIG. 6 is a sectional view of the machine taken along the line 6—6 of FIG. 5.

The duct 10 is illustrated in FIGS. 2 and 3, and is formed with a wire 22 which has a permanent set in the form of a coil with a plurality of turns 24, each turn 24 being in the configuration of an oval. The wire is constructed of resilient material, such as carbon spring steel. The wire is disposed between an outer ribbon 26 and an inner ribbon 28 of substantially air impermeable flexible material, and a layer 30 of cement is disposed between the ribbons 26 and 28 and between each of the ribbons 26 and 28 and the wire 22. The ribbons 26 and 28 are of the same width, and the ribbons 26 and 28 are wound into an elongated air impermeable tube, designated 40. In the preferred construction, a narrow portion 32 of the outer ribbon 26 adjacent to leading edge 34 of each turn overlaps a narrow portion 36 at the trailing edge 38 of the adjacent turn. The layer 30 of cement is formed by a first coating 30a substantially covering the entire inner surface of the outer ribbon 26 and a second coating 30b substantially covering the entire outer surface of the inner ribbon 28, and hence the layer 30 of cement extends between the portions 32 and 36 to interconnect adjacent turns.

The flexible ribbons 26 and 28 are not self supporting and are supported by the coil of wire 22 as an elongated tube 40. As illustrated in FIG. 3, the cross section of each turn 24 of the coil of wire 22 is oval, and accordingly, at each turn 24, the cross section of the coil formed by the tube 40 of ribbons 26 and 28 and wire 22 is also oval. Each turn 24 of the wire coil has an axis of elongation 42 and a transverse axis 44, and the permanent set of the wire 22 positions these axes for all turns parallel to each other. However, because the wire is relatively thin and resilient, it may readily be bent to position the axes of the turns in any desired relationship, but the resiliency of the wire tends to return the turns to the permanent set of the wire 22 unless restrained.

Further, the ribbons 26 and 28 provide a limit on the distance that adjacent turns 24 of the wire may become spaced from each other, and therefore a limit on the longitudinal expansion of the duct 10. The spacing between adjacent turns of the wire coil also facilitate making sharp bends in the duct 10 in that the longer the spacing the fewer turns that are required to make any specific bend. The maximum spacing between adjacent turns also determines the amount of sagging of the ribbons 26 and 28 into the duct 10, and shorter spacing of the turns is desirable to minimize sagging. In a preferred construction, the ribbons 26 and 28 have widths of 1 25/32 inches and the wire turns 24 have maximum spacings between adjacent turns of about 1½ inches.

The ribbons 26 and 28 are formed of clear transparent plastic, and a coating 46 is disposed on the interior surface of the outer ribbon 26 in order to reflect heat inwardly from the air flowing through the duct and provide a vapor barrier to maintain moisture within the duct. In the preferred construction, the plastic ribbons 26 and 28 are about 0.0006 inch thick and of polyester plastic. The ribbon 26 is provided with an aluminum coating 46 on its inner surface. In this preferred construction, the wire 22 is round and constructed of galvanized coated, high carbon, hard-drawn spring steel. The wire 22 has a diameter of about 0.044 inch. As stated above, the duct 10 has a axis of elongation of about 7½ inches and a transverse axis of about 3¼ inches.

In producing an oval duct according to the present invention, the aluminum reflective coating 46 is applied to the surface of the ribbon 26 which will become the inner surface thereof, and thereafter the inner aluminum coated surface of the elongated plastic ribbon 26 and the outer surface of the ribbon 28 are coated with cement. Thereafter, a round tube of the elongated ribbons 26 and 28 and wire 22 is formed on a cylindrical mandrel with overlapping edges cemented together to form an elongated duct of circular cross section and any desired length. Processes for producing round flexible duct suitable for use in heating, cooling or ventilating systems are in commercial use and disclosed in several United States patents, namely, U.S. Pat. No. 4,104,097 to Raymond A. Gregory and DeWitte Clifford Wilcox; U.S. Pat. No. 4,299,641 to Walter F. Kelly; and U.S. Pat. No. 4,459,168 to Anthony C. Anselm, and these processes may be used to produce the round flexible wire supported tube.

The next step in producing an oval duct according to the present invention is to reform the circular duct described above into an oval duct. FIGS. 4 through 7 illustrate a machine, referred to herein as a reformer and designated 48, for reforming the round flexible duct described above to establish a new permanent set for the coil of wire 22, the new permanent set configuring each turn of the coil into a generally oval shape.

Figure 4:
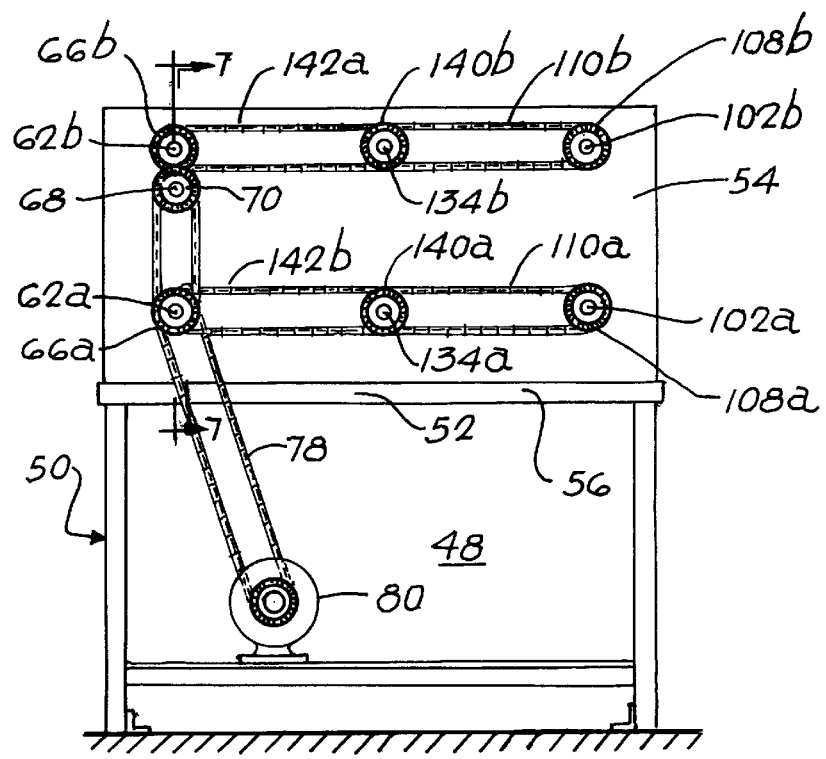
FIG. 4 is a front elevational view of a machine for reforming a round flexible duct into an oval duct.
Figure 5:
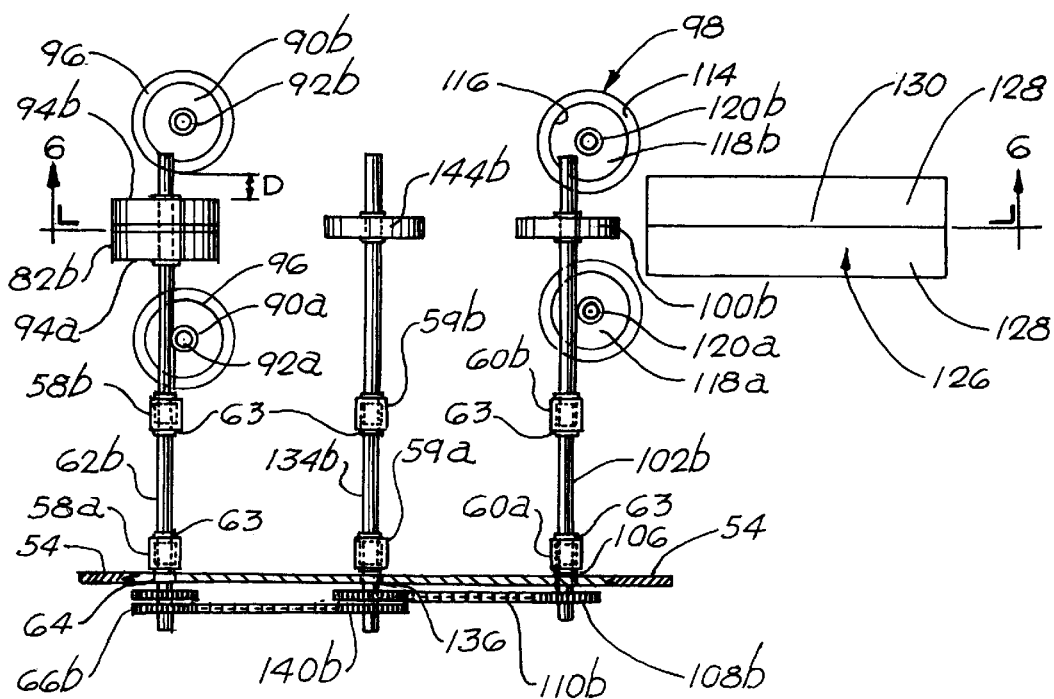
FIG. 5 is a plan view of the machine of FIG. 4.
Figure 7:
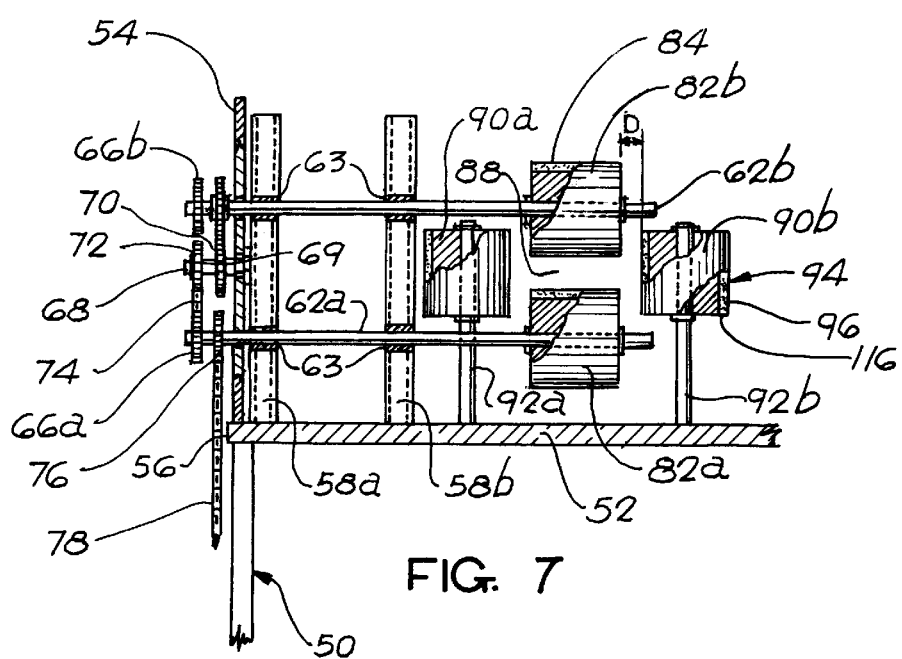
FIG. 7 is a fragmentary sectional view taken along line 7—7 of FIG. 4.

As illustrated in FIG. 4, the reformer 48 has a stand 50 which is provided with a generally horizontal table 52. A plate 54 extends upwardly from one edge 56 of the table 52. Three pairs of posts 58a and 58b, 59a and 59b, and 60a and 60b are mounted on and extend upwardly from the table 52, each pair being disposed in a plane normal to the table 52 and plate 54. One of the posts 58a, 59a and 60a of each pair is disposed adjacent to the plate 54, and the posts of each pair are spaced from each other by the same distance.

A first pair of shafts 62a and 62b are journaled on the first pair of posts 58a and 58b within bearings 63 mounted on the posts 58a and 58b, the shafts being disposed horizontally and spaced from each other in a plane normal to the table 52. The shafts 62a and 62b extend through apertures 64 in the plate 54, and a pair of gears 66a and 66b are mounted on the portions of the shafts protruding from the side of the plate 54 opposite the pair of posts 58a and 58b, respectively, the gears being rotatable with the shafts 62a and 62b. A stud 68 is rotatably mounted on the plate 54 by a bearing 69 between the gears 66a and 66b, and a reversing gear 70 is mounted on the stud 68 for rotation therewith and engages the gear 66b on shaft 62b. A drive gear 72 is also mounted on the stud 68 for rotation therewith, and the drive gear 72 is coupled to the gear 66a on the shaft 62a by a chain 74. As a result of this construction, the shafts 62a and 62b are interconnected to rotate in opposite directions, and the gear ratios have been selected to rotate the shafts 62a and 62b at the same rate, all gears being of the same diameter.

Shaft 62a also carries a second gear 76 which rotates with the shaft 62a, and the second gear 76 is connected by a chain 78 to a motor 80. Power from the motor 80 is thus coupled to the shafts 62a and 62b to rotate them in opposite directions at the same rate.

Cylindrical rollers 82a and 82b, referred to as reformer rollers, are mounted coaxially on shafts 62a and 62b, respectively, for rotation therewith. The rollers 82a and 82b have cylindrical surfaces 84 which confront each other and are spaced from each other by a distance substantially less than the diameter of the round flexible duct to be reformed and somewhat less than the transverse axis of the oval duct to be produced. Further, the surfaces 84 of the rollers 82a and 82b are provided with a no-slip covering or layer 86 secured to the cylindrical surfaces of the rollers, as by a layer of cement 87, and the distance between the confronting surfaces of the layers 86 is referred to herein as the gap 88.

The inventor has attempted to reform round flexible duct into oval duct by introducing the round duct into the gap 88 between the rotating rollers 62a and 62b of the apparatus described above and compressing the helical coil of wire 22 to assume an oval shape, but such attempts proved unsuccessful for two reasons, namely, it was difficult to maintain the round duct in proper alignment with the rollers 82a and 82b, and even if proper alignment was maintained, the bends between the elongated portions of each turn of the coil of the flexible duct became too sharp, thus reducing the capacity of the duct beyond that of the desired oval shape.

The inventor found that both of the foregoing problems were substantially reduced by the addition of a pair of drums 90a and 90b journaled for free rotation on shafts 92a and 92b which extend vertically from the table 52 on opposite sides of the rollers 82a and 82b. The drums 90a and 90b also have cylindrical surfaces 94 which are covered with a no-slip layer 96, and the inventor seeks to position the layers 96 to confront each other on opposite sides of the gap 88 between the rollers 82a and 82b, but the plane of the drums 90a and 90b must be positioned forward of this position to permit the shaft 92a to pass to the side of shaft 62a. The drums 90a and 90b are not powered but are free to rotate about the shafts 92a and 92b, and the surfaces of the layers 96 on the drums 90a and 90b are spaced from each other by a distance less than the desired longitudinal axis of the oval duct to be formed.

In operation, the roller 82a rotates counterclockwise and the roller 82b rotates clockwise. The drums 90a and 90b are effective in centering the duct to be reformed into the gap 88 between the rollers 82a and 82b. In addition, however, the drums 90a and 90b limit the elongation of the turns of the coil of the duct being reformed, and thereby force a more rounded U-shaped bend at each end of the longitudinal axis of each turn of the coil of the wire 22.

The distances (D in FIG. 5) between the one end 94a of the rollers 82a and 82b and the confronting surface of the drum 90b, and the distances between the other end 94b of the rollers 82a and 82b and the confronting surface of the drum 90a, are important to the process of reforming the bends at the ends of the axes of elongation 42 of the turns 24 of the wire 22 of the duct 10. At the moment of contact of the reformer rollers 82a and 82b with the duct to be reformed, the rollers 82a and 82b reform the wire turn in the gap 88 to form two confronting elongated portions with substantially straight permanent sets. At the same time, the confronting end portions of the turn engage the drums 90a and 90b and are placed under pressure across the distance D, hence resulting in two bends at each end of the axis of elongation of the turn, the two bends forming the U-shaped end portions of each turn. The inventor has found that best results are obtained if the distances D between the ends 94a and 94b of the rollers 82a and 82b and the confronting surfaces of the drums 90a and 90b are approximately one-fourth of the minimum distance between the outer surfaces of the layers 96 on the drums 90a and 90b. In this preferred construction, the longitudinal axes of the rollers 82a and 82b is approximately one-half of the minimum distance between the outer surfaces of the drums 90a and 90b.

The inventor has also found that as each turn of the coil of the duct to be reformed enters the gap 88 and engages the rollers 82a and 82b, the duct rotates slightly so that the turns of the wire coil of the reformed duct do not have a permanent set with the longitudinal axes of the oval duct in the same plane. To avoid this twisting of the duct, at least one and preferably two additional input stages are required.

The first input stage 98 is mounted on the table 52 at the input side of the reformer rollers 82a and 82b. A second pair of shafts 102a and 102b are journaled on the third pair of posts 60a and 60b within bearings 63 mounted on the posts 60a and 60b, the shafts being disposed horizontally and spaced from each other by the same distance as shafts 62a and 62b in a plane normal to the table 52. The shafts 102a and 102b extend through apertures 106 in the plate 54, and a pair of gears 108a and 108b are mounted on the portions of the shafts protruding from the side of the plate 54 opposite the pair of posts 60a and 60b, respectively, the gears being rotatable with the shafts 102a and 102b. The gears 108a and 108b are coupled by chain drives 110a and 110b to the shafts 62a and 62b, respectively. As a result of this construction, the shafts 102a and 102b rotate in opposite directions in synchronism with the shafts 62a and 62b.

Cylindrical rollers 100a and 100b are mounted coaxially on shafts 102a and 102b, respectively, for rotation therewith. The rollers 100a and 100b have cylindrical surfaces 104 which confront each other and are spaced from each other by a minimum distance or gap 103 substantially equal to the minimum distance between the cylindrical surfaces of the rollers 82a and 82b. The surfaces 104 of the rollers 100a and 100b are provided with a no-slip covering or layer 114 secured to the cylindrical surfaces of the rollers, as by a layer of cement 116.

A pair of drums 118a and 118b are journaled for free rotation on shafts 120a and 120b which extend vertically from the table 52 on opposite sides of the rollers 100a and 100b. The drums 118a and 118b also have cylindrical surfaces 122 which are covered with a no-slip layer 124, and layers 124 are positioned to confront each other on substantially opposite sides of the gap 103 between the rollers 100a and 100b, the plane of the drums 118a and 118b being slightly forward of the axial plane of the rollers 100a and 100b.

The outer surfaces of the layers 124 on the drums 118a and 118b are spaced from each other by a distance less than the minimum distance between the drums 90a and 90b of the former stage, but at least equal to the diameter of the circular duct before reforming, the distance being sufficiently short to cause the duct being formed to engage the drums 118a and 118b and center the duct in the gap 103 between the rollers 100a and 100b, but no longer than the transverse axis of the oval duct to be formed.

The purposes of the first input stage 98 are to guide the round duct to be reformed into the reformer rollers 82a and 82b with each turn 24 of the coil of wire 22 as close to the plane of the axes of the rollers 82a and 82b as possible, and to avoid twisting of the duct in the reforming process. The first input stage 98 does not provide significant forming of the duct, and accordingly the rollers 100a and 100b have an axial length of about one-half of that of the rollers 82a and 82b of the reformer stage, i.e. about one-fourth of the distance between the drums 90a and 90b. Accordingly, the duct to be reformed is seized between the rollers 100a and 100b along what becomes the transverse axis of the duct and the tendency to twist is minimized. A V-shaped trough 126 is provided at the input side of the first input stage to facilitate proper alignment of the round duct into the rollers 100a and 100b. The trough 126 has a pair of flat panels 128 extending upwardly from a central straight line interface 130 which is perpendicular to the plane of the axes of the rollers 100a and 100b and aligned with the intersection of the gap 103 and the surface of the roller 100a.

While the duct being reformed may be passed directly from the first input stage 98 to the reformer rolls 82a and 82b, further reduction in the tendency for twisting the reformed duct can be achieved by a second input stage 130. The second input stage 130 has a third pair of rollers 132a and 132b, referred to as input rollers, mounted on shafts 134a and 134b for rotation therewith. The shafts 134a and 134b are journaled in bearings 136 on posts 59a and 59b, and the shafts 134a and 134b extend through apertures 138 in the panel 54 to engage gears 140a and 140b, respectively. Chains 142a and 142b engages gears 140a and 140b and rotates the shafts 134a and 134b, respectively. A pair of rollers 144a and 144b are mounted on the shafts 134a and 134b, respectively, and rotate in the same directions as the rollers 100a and 100b of the first input stage 98 and at the same rate. The rollers 132a and 132b are identical to the rollers 100a and 100b and aligned therewith. The duct being reformed traverses the second input stage 130 as an extended and relatively stiff pipe due to the forward pull of the reformer rollers 82a and 82b and restraint placed on the duct by the operator during the process of feeding the round duct into the first input stage, and therefore it is not necessary to provide vertically mounted drums on opposite sides of the rollers 132a and 132b in the second input stage 130, as was done in the first input stage 98.

In operation, the operator introduces the open end of a round flexible duct onto the trough 126 and thereafter in to the gap 103 between the rollers 100a and 100b of the first input stage 98, maintaining the first turn 24 of the coil of wire 22 of the open end of the duct as parallel to the plane of the rollers 100a and 100b as possible. Thereafter, duct being reformed will pass between the rollers 132a and 132b of the second input stage 130 to the reformer rollers 82a and 82b. The reformer rollers 82a and 82b then propel the duct being reformed forward placing the plastic outer tube under tension and stiffening the tube, thus maintaining the following turns 24 of the coil of wire in proper position for permanent set modification.

Those skilled in the art will devise many modifications of the duct and method of making duct disclosed herein within the scope of the invention. Further, those skilled in the art will find application for the devices and processes disclosed herein beyond those specifically described, but within the scope of the present invention. It is therefore intended that the scope of the present invention be not limited by the foregoing specification but only by the appended claims.

What is claimed is:

1. A duct for conducting pressurized air in a heating or cooling or ventilating system comprising an elongated resilient wire disposed in a coil consisting of a plurality of substantially identical turns, an elongated air impermeable flexible tube, said tube having an axial channel of uniform cross section extending along the axis of elongation of the tube, the circumference of the tube at the channel being approximately equal to the length of each turn of the wire coil, the wire coil being disposed coaxially of the flexible tube and the tube being attached to the coil, characterized by the improved construction wherein each turn of the wire coil consists of two elongated side portions and two end portions connected in a series, the side portions being substantially longer than the end portions and confronting each other, the side portions having opposite ends, one end of one side portion being connected to one end of the other side portion by one end portion, and the other end of the one side portion being connected to the one end of the other end portion, each of the end portions having a permanent set in the form of a U-shaped bend, and the side portions of each turn of the wire coil confronting the side portions of adjacent turns of the wire coil.

2. A duct for conducting air in a heating or cooling or ventilating system comprising the combination of claim 1 wherein the tube is constructed of plastic.

3. A duct for conducting air in a heating or cooling or ventilating system comprising the combination of claim 2 wherein the tube is constructed of two ribbons of thin film and a layer of cement disposed between the ribbons, each of the ribbons having parallel opposed edges and a central axis of elongation, and the axes of elongation of the ribbons being aligned, the assembled ribbons being wound into a multiturn coil with a portion of the assembled ribbons disposed adjacent to the one edge of each turn of said assembled ribbons overlapping and being affixed to a portion of the adjacent turn of the assembled ribbons at the other edge of said adjacent turn to form the air impermeable tube.

4. A duct for conducting air in a heating or cooling or ventilating system comprising the combination of claim 3 wherein the wire of the coil is disposed between the ribbons and aligned with the axes of elongation of the ribbons, the assembled ribbons and wire being wound into the multiturn coil forming the air impermeable tube.

5. A duct for conducting air in a heating or cooling or ventilating system comprising the combination of claim 4 wherein the wire is constructed of spring steel.

6. A duct for conducting air in a heating or cooling or ventilating system comprising the combination of claim 1 wherein each turn of the wire coil has a transverse axis disposed normal to and centrally of the longitudinal axis thereof, and wherein the radius of curvature of the bends in each turn of the wire coil is no greater than one-half of the length of the central transverse axis of said wire turn.

7. A duct for conducting air in a heating or cooling or ventilating system comprising the combination of claim 6 wherein the wire in each turn of the coil has a permanent set between bends providing segments between bends which have a substantially straight configuration.

8. A duct for conducting air in a heating or cooling or ventilating system comprising the combination of claim 1 wherein the tube is constructed of two ribbons of thin flexible film and a layer of cement is disposed between the ribbons, each of the ribbons having parallel opposed edges and a central axis of elongation, and the axes of elongation of the ribbons being aligned and confronting each other, the wire of the coil being disposed between the ribbons aligned with the axes of elongation of the ribbons, the assembled ribbons and wire being wound to form a multiturn coil and the assembled ribbons and wire having a first portion extending from the one edge of each turn overlapping and being affixed to a second portion extending from the other edge of the adjacent turn, thereby forming the air impermeable tube.

9. A duct for conducting pressurized air in a heating or cooling or ventilating system comprising an elongated resilient wire disposed in a coil consisting of a plurality of substantially identical turns, an elongated air impermeable flexible tube, said tube having an axial channel of uniform cross section extending along the axis of elongation of the tube, the circumference of the tube at the channel being approximately equal to the length of each turn of the wire coil, the wire coil being disposed coaxially of the flexible tube, and each of the turns of said coil of wire being individually attached to the plastic tube along the entire length of the turn and at a common distance significantly greater than the cross section of the wire between adjacent turns of the coil, the turns of said coil of wire having sufficient stiffness to support the tube in the configuration of the coil, each turn of the wire coil being substantially identical and consisting of two elongated side portions and two end portions, the side portions being substantially longer than the end portions and confronting each other, the side portions having opposite ends, one end of one side portion being connected to one end of the other side portion by one end portion, and the other end of the one side portion being connected to the other end portion, each of the end portions having a permanent set in the form of a U-shaped bend, and the side portions of each turn of the wire coil confronting the side portions of adjacent turns of the wire coil.

\* \* \* \* \*